US012769694B2

(12) United States Patent
Leingruber et al.

(10) Patent No.: US 12,769,694 B2
(45) Date of Patent: Oct. 20, 2026

(54) METHOD AND CONTROL DEVICE FOR RELIABLE ON-BOARD COMMUNICATION

(71) Applicant: ZF Friedrichshafen AG, Friedrichshafen (DE)

(72) Inventors: Kai Leingruber, Ravensburg (DE); Christoph Stritt, Bad Waldsee (DE); Matthias Stauber, Friedrichshafen (DE); Georg Willmann, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 33 days.

(21) Appl. No.: 18/253,145

(22) PCT Filed: Oct. 26, 2021

(86) PCT No.: PCT/EP2021/079659

§ 371 (c)(1),
(2) Date: May 16, 2023

(87) PCT Pub. No.: WO2022/111930

PCT Pub. Date: Jun. 2, 2022

(65) Prior Publication Data

US 2023/0418778 A1 Dec. 28, 2023

(30) Foreign Application Priority Data

Nov. 27, 2020 (DE) ..................... 10 2020 214 930.5

(51) Int. Cl.
*G06F 13/42* (2006.01)

(52) U.S. Cl.
CPC ................................ *G06F 13/4282* (2013.01)

(58) Field of Classification Search
CPC ................................................... G06F 13/4282

(Continued)

(56) References Cited

U.S. PATENT DOCUMENTS

| | | | |
|---|---|---|---|
| 10,721,241 | B2 | 7/2020 | Kneib et al. |
| 2003/0212942 | A1 | 11/2003 | Nagaura et al. |

(Continued)

FOREIGN PATENT DOCUMENTS

| | | | |
|---|---|---|---|
| DE | 10 2012 219 093 | A1 | 4/2013 |
| WO | 2020/187985 | A1 | 9/2020 |

OTHER PUBLICATIONS

European Patent Office, International Search Report issued in International patent application No. PCT/EP2021/079659 (Feb. 2, 2022).

(Continued)

*Primary Examiner* — Titus Wong
(74) *Attorney, Agent, or Firm* — Secant IP, PLLC

(57) ABSTRACT

Method for secure on-board communication between components (2, 4) of a vehicle by way of a communication bus (6) of the vehicle. The method includes (S1) sending a message from a component (2; 4) to the communication bus (6), (S2) storing information of the message sent in the component (2; 4), (S3) reading all the messages on the communication bus (6) by the component (2; 4), (S4) comparing information in the messages read with the information in the message sent by the component (2; 4), and (S5) initiating a countermeasure in reaction to a deviation based on the comparison of information in the read messages with the information in the sent message. Also disclosed is a control unit, a system and a vehicle which are designed to carry out such a method for secure on-board communication between components.

13 Claims, 1 Drawing Sheet

(58) Field of Classification Search
USPC .......................................................... 710/105
See application file for complete search history.

(56) References Cited

U.S. PATENT DOCUMENTS

| | | | | |
|---|---|---|---|---|
| 2015/0172306 | A1 | 6/2015 | Kim et al. | |
| 2017/0093659 | A1* | 3/2017 | Elend ...................... | H04L 67/12 |
| 2018/0359262 | A1* | 12/2018 | Kneib ....................... | G06F 8/65 |
| 2019/0260772 | A1 | 8/2019 | Juliato et al. | |
| 2022/0329614 | A1* | 10/2022 | Kamp ................. | H04L 63/1425 |

OTHER PUBLICATIONS

European Patent Office, Written Opinion issued in International patent application No. PCT/EP2021/079659 (Feb. 2, 2022).

German Patent Office, Office Action issued in German patent application No. 10 2020 214 930.5 (Oct. 11, 2021).

* cited by examiner

METHOD AND CONTROL DEVICE FOR RELIABLE ON-BOARD COMMUNICATION

RELATED APPLICATIONS

This application claims the benefit under 35 U.S.C. § 371 as a U.S. National Phase Application of application no. PCT/EP2021/079659, filed on 26 Oct. 2021, which claims benefit of German Patent Application no. 10 2020 214 930.5 filed 27 Nov. 2020, the contents of which are hereby incorporated herein by reference in their entireties.

TECHNICAL FIELD

The technical field relates to on-board communication, in particular secure on-board communication, between components of a vehicle by way of a communication bus.

PRIOR ART

From the prior art options are known for secure communication between components by way of a communication bus. For example, monitoring devices can be used that centrally monitor the communication on the bus in such manner that all messages communicated via the bus are associated with a sending component and the reports are checked for possible manipulation by a central component.

DESCRIPTION OF THE INVENTION

The invention relates to a method for secure on-board communication between components of a vehicle by way of a communication bus of the vehicle. One or more components can be control units, such as an engine control unit or a brake control unit, an actuator such as an electric motor for moving a movable part of the vehicle, such as the tailgate, or a sensor device such as a temperature sensor or motor rotation speed sensor. The vehicle can be a passenger car or a truck. The communication bus can be a CAN bus, a FlexRay bus, a LIN bus, or a MOST bus. The on-board communication can take place between at least two components, for example between a control unit and an actuator. Alternatively, or in addition, the on-board communication can take place between more than two components, for example between a number of control units, actuators, and sensors. Secure on-board communications between components of a vehicle by way of a communication bus can be a communication in which only such components can communicate as are authorized to use the on-board communication system. Secure on-board communications can alternatively or in addition concern the communication of correct content between authorized components.

The method comprises a step of sending a message from the component to the communications bus. Alternatively, or in addition, several messages can be sent from the component to the communications bus. The component can comprise a microcontroller and a sender/receiver unit, which can be designed to carry out the step of sending. The message can comprise a heading data field and a main data field. The message can be addressed by a first component to a second component, and information relating to the first and second component can appear in the heading data field. The main data field of the message can contain the data to be transmitted. For example, as the first component, a temperature sensor can send a message addressed to a heating control unit as the second component, and in that case the heading data field would contain information about the temperature sensor and the heating control unit, while the main data field would contain information about the temperature value measured.

In addition, the method comprises a step of storing information about the message sent to the component. For that purpose, the component can comprise a storage medium, for example a flash-memory. In the storage step the entire message sent can be stored on the storage medium. Alternatively, only part of the message sent can be stored in the memory of the component. For example, information in the heading data field, and alternatively or in addition, information in the main data field can be stored in the memory of the component. The information in the message sent can be stored in the component for a given time. That time can be predetermined. The time can depend on an event or a condition such as free memory space in the storage medium. Alternatively, or in addition, the information in the message sent can be stored in the component until a specifiable point in time, for example until the component is shut down. The information in the messages sent can be stored for all the messages sent by the component.

Furthermore, the method has a step in which all the messages on the communication bus are read by the component, and the sender/receiver unit can be designed to carry out that step. In the reading step, information can be captured from every message that has been sent by way of the communication bus. This information can be information from the heading data field of all the messages. Alternatively, or in addition, it can be information from the main data field of all the messages. The reading step can include a step of intermediate storage of information captured from all the messages. The information captured from all the messages can be stored intermediately on the storage medium of the component and the microcontroller can be designed to carry out this intermediate storage step.

In addition, the method has a step in which the information in the messages read is compared with the information in the message sent out by the component. The comparison step can take place between all the messages read from the communication bus and all the messages stored in the component. In the comparison step it is possible for only part of the information in the messages read to be compared with part of the information in the message sent. For example, information from the heading data field of one or more read messages can be compared with information from the heading data field of one or more sent messages. Alternatively, or in addition, information from the main data field of one or more read messages can be compared with information from the main data field of one or more sent messages.

The method further comprises a step of initiating a countermeasure in reaction to a deviation based on the comparison of the information in the messages read with the information in the message sent. The deviation can also be based on the comparison between the information in the read messages and the information in all the stored messages. A deviation of information in the read message from information in the sent message can, for example, take the form of a difference between the heading data fields of the sent and the read messages. Alternatively, or in addition, a deviation of the information in the sent and the read messages can be a difference of the information in the main data fields of the sent and the read messages. The countermeasure can comprise, for example, the initiation or production of a more secure vehicle condition. For example, a more secure vehicle condition can be produced in that the drive-train of the vehicle is opened or the engine power of a drive aggregate of the vehicle is throttled down. The more secure vehicle condition can also be produced if the control of at least one actuator that actuates at least one vehicle component is changed.

The countermeasure can be initiated when there is exactly one deviation between a read message and a sent message. Alternatively, or in addition, the countermeasure can be initiated if there is more than one deviation between one or more read messages and one or more sent messages.

The actuators can for example be electric motors or electromagnetic valves by means of which vehicle components can be controlled. As a vehicle component, for example, a vehicle brake can be actuated. The vehicle brake can be, for example, a service brake or a retarder or intarder. A retarder is a wear-free hydrodynamic or electro-dynamic permanent brake, mainly used in utility vehicles. In contrast to a retarder, a so-termed intarder can be integrated in a transmission of the vehicle in a space-saving manner.

For example, an actuator for actuating a vehicle brake such as a retarder or intarder can be controlled if the more secure condition of the vehicle is to be produced by braking the vehicle. On the other hand, if a vehicle brake is actuated owing to a manipulated message, then by virtue of the difference found between the information in the read message and the information in the sent message, which led to the activation of the vehicle brake, the vehicle brake is deactivated again.

Starting from the secure vehicle condition, the condition of the vehicle can be returned to normal when predetermined driving or operating conditions are satisfied. For example, a change to the normal vehicle condition can take place again after the vehicle has been at rest, or after an activation of a parking brake of the vehicle, or after an ignition change (ignition off/ignition on) has taken place. This can prevent the vehicle from being immobilized as a result of a time-limited manipulated message.

If, however, the manipulated message reappears after a change to the normal vehicle condition, it can be provided that a return to the normal vehicle condition is prevented. The return to the normal vehicle condition can be prevented, for example, only if the manipulated message has occurred multiple times.

As described earlier the components of the control unit can include, for example, a microcontroller, a storage medium, and a sender/receiver unit. The microcontroller and the sender/receiver unit can be designed to send out the message. The microcontroller can be designed to store the sent-out message on the storage medium. The sender/receiver unit can be designed to read all the messages on the communication bus. Moreover, the sender/receiver unit can be designed to send the messages it has read to the microcontroller and the microcontroller can also be designed to store the received and read messages on the storage medium. The microcontroller can be designed to compare information in the read messages with information in the sent messages, in particular with all the messages stored on the storage medium. The microcontroller can be further designed, on the basis of the comparison, to identify a deviation and to initiate the countermeasures in reaction thereto, and for that purpose a corresponding signal can be sent from the microcontroller by way of the sender/receiver unit to the communication bus.

Thus, advantageously, a method is now available which, on the basis of a comparison of information from the messages read off the communication bus with the information in the sent message, provides secure on-board communication. By storing the message or messages sent out in the component, it can be ensured that the comparison step takes place with reference to actual information relating to the message or messages sent out. Advantageously, therefore, a specification of a comparison list of external messages to be compared with the messages read from the communication bus can be avoided, and instead the comparison can be carried out self-sufficiently by the component, in particular independently of any specified comparison lists. This can further increase the security of the on-board communication, since even specified comparison lists from outside to the component can be compromised. Thanks to the comparison step, a compromised condition of the communication bus on which a message is sent, which has no comparable stored message on the component, is recognized by the component. Advantageously, thereafter the component itself can initiate a countermeasure in reaction to the deviation, on the basis of the comparison. In that way, the time during which the communication bus is compromised but that condition has not yet been recognized, can be minimized. This can further increase the security of the on-board communication.

According to a further embodiment, a group of messages can be sent by the component. A group of messages can consist of two or more messages. For example, messages sent one after another in time can be combined into a group of messages. Alternatively, messages addressed to a particular component can be combined into a group. The sending step can therefore be the sending of a group of messages from the component to the communication bus. Moreover, information about the group of messages sent is stored in the component. In that case the microcontroller can be designed to carry out the step of sending the information about the group of messages sent to the component, and to store information about the group of messages sent on the storage medium. Moreover, information about the messages read is compared with information about the group of messages sent. In that case a microcontroller can be designed to carry out the step of initiating the countermeasure in reaction to a deviation on the basis of the comparison of the information in the messages read with information in the group of messages sent. Alternatively, several groups of messages can also be sent, stored and compared with read messages.

By storing the sent messages as a group of messages, the management data per message sent can be reduced. This can reduce the memory capacity of the storage medium required for the purpose. Moreover, the step in which the microcontroller compares messages read from the communication bus with the group of messages or the groups of messages sent, can take place more efficiently, since instead of the individual sent messages the comparison is carried out with the group or groups of messages.

According to a further embodiment, an identifier is associated with every message. Alternatively, or in addition, an identifier is associated with one or more and, in particular, all the message groups sent. The identifier can identify the message, or alternatively or in addition, the group of messages, unambiguously. For example, the identifier can be stored in the heading data field of the message. Alternatively, or in addition, the identifier can be stored in the main data field of the message. The identifier of the message, for example, can comprise information about the sending component, the receiving component, and at least part of the content of the message.

Thus, the message advantageously can be associated by means of its identifier with the sending component, the receiving component, and alternatively or in addition with the content of the message. In that way the message and information relevant to the message can be processed efficiently by virtue of its identifier, and in particular only the identifier of the message can be stored, read, or compared. This can increase the efficiency of the method for secure on-board communication, since the storage, reading or comparing of unnecessary data can be avoided.

According to a further embodiment, each identifier has a source address of the component. The source address can thus characterize each component unambiguously. The source address can be, for example, an IP address.

Advantageously, therefore, every message sent to the communication bus can be associated with a source component in a simple and efficient manner. This information about the source component can thus be read for each component participating in the communication bus by way of its identifier. Thus, a component can be associated with every message on the communication bus.

According to a further embodiment the deviation of the information in the read message from the information in the message sent by the component is determined in the comparison step. In a first part-step it is first checked for which read messages the respective identifier contains the source address of the component. In a second part-step it is then checked for these read messages whether information from all the read messages deviates from the information in the sent message. Alternatively, or in addition, this can be done in relation to the information in the group of messages sent, and also alternatively or in addition for the messages sent.

In this case the microcontroller can be, for example, designed to compare the identifiers of all the messages read from the communication bus with the source address of the component. If this comparison is positive, i.e., if the identifier of a message read from the communication bus contains the source address of the component, then the microcontroller can be designed to carry out the second part-step of checking a deviation of information in this read message from information in the sent message, alternatively or in addition, in the sent group of messages, and also alternatively or in addition in the sent messages. A deviation can be, in this context, a deviation of all the information in the read message from the sent message, or alternatively or in addition, only some of the information in the read message from the sent message. For example, the information in the read and the sent messages can both contain test data, such as a checksum. In that way, a deviation between the read and the sent data can be noted particularly simply.

Advantageously, the step of determining the deviation by comparison can be divided into two part-steps, such that in the first part-step the identifier of all the messages read is compared with the source address of the component, and in the second part-step the check for deviation of information between the read and the sent messages only takes place for messages that have been read from the communication bus and whose identifier contains the source address of the component. In that way, the resources, particularly the comparison resources of the microcontroller of the component, can be concentrated only on the messages relevant for the component concerned, i.e., the messages with an identifier that contains the source address of the component. This can increase the efficiency of the method.

According to a further embodiment, the deviation is determined if at least one read message deviates from all the messages sent by the component. In other words, a deviation may be present if the component for a message read from the communication bus, which has an identifier corresponding to the source address of the component, determines a deviation from a corresponding message sent by the component. For example, a deviation can also be determined if a message read from the communication bus has an identifier that contains the source address of the component, and for that message there is no corresponding message among all the messages of the group and/or groups of messages sent by the component.

Advantageously, therefore, for all the messages associated with the component, i.e., all the messages with an identifier containing the source address of the component, it can carry out on the communication bus a comparison with all the messages it has sent, in particular the messages it has stored, and thereby determine that the communication bus has been compromised if a message with an identifier associated with the component is sent to the communication bus, which it has not just sent.

According to an embodiment the countermeasure is initiated directly by the component. Alternatively, or in addition, the countermeasure can be initiated indirectly by the component. A direct initiation of the countermeasure by the component can include, for example, the direct sending of a control signal, such as a signal to the drive-train component to open the drive-train. The indirect initiation of the countermeasure by the component can be, for example, the sending of information relating to the compromising of the communication bus, detected by means of the method at a further component, such that the said further component can for example initiate the countermeasure directly. Alternatively, or in addition, the initiation of the countermeasure by the component can involve sending a report via the communication bus to all the components connected to it, the said report containing information about the compromising of the communication bus. Advantageously, in that way all the components can be notified that the communication bus is compromised.

According to a further embodiment it can be provided that previously detected messages may be sent by at least two components with the same identifier. In order that the comparison of information in the read messages with the information in the message sent by the component should not result in the initiation of a countermeasure in reaction to the recognized difference, in this case it is provided that such messages are fixed in advance and stored in a storage medium. The storage medium can be, for example, in the form of a non-volatile memory of the component. The storage medium can be, for example, integrated in the microcontroller of the component. The memory can contain a list of messages which, when read by the component, do not result in triggering the countermeasure. Thus, in the said list are stored messages whose identifier contains the source address of the component itself. Thereby, a read message from another component will itself then not trigger the countermeasure if the message contains the same identifier as the particular component. In that way a special case can be created in which at least two components are allowed to use the same identifier for messages.

A further aspect of the invention relates to the control unit for secure on-board communication, which comprises the microcontroller, the storage medium and the sender/receiver unit, wherein the microcontroller is designed to carry out the method in accordance with one of its embodiments making use of the storage medium and the sender/receiver unit. The storage medium can be a flash memory. The sender/receiver unit can be designed only to send messages to the communication bus and to read messages from the communication bus.

A further aspect of the invention relates to a system used for secure on-board communication, which comprises the control unit according to a further aspect of the invention, the communication bus, and a further control unit. The system can comprise an on-board power supply. Alternatively, or in addition, the system can comprise one or more actuators and, alternatively or in addition, one or more sensors.

According to another embodiment, the further control unit is a control unit in accordance with a previously described aspect of the invention, i.e., a control unit that carries out the method for secure on-board communication, in accordance with an aspect of the invention. Advantageously, in that way a system can be provided wherein each component reads all the messages sent to the communication bus, checks which messages read from the communication bus have an identifier that contains the source address of the component concerned, and for those read messages checks whether a corresponding message has been sent by the said component concerned. Thus, the method for secure on-board communication can be carried out in a decentralized manner by the components of the system. This can be particularly advantageous when the system is extended with additional components, for example further control units, sensors or actuators. Thus, the method for secure on-board communication can be of modular design.

A further embodiment of the invention relates to a system wherein the further control unit comprises a sender-receiver unit which is designed to carry out a method for secure on-board communication centrally, for further control units of the system. Thus, the control unit that carries out the method in accordance with an embodiment thereof can also be connected simply and quickly to existing, centrally operating systems. In this case the existing system does not have to be extended by the modular-operating control unit with an embodiment of the method. In particular, the existing centrally operating system with conventional hardware for ensuring the secure on-board communication need no longer be enabled to check the messages with identifiers that correspond to newly connected control units. That can be monitored self-sufficiently by the newly connected control unit.

A further aspect of the invention relates to a vehicle with a system in accordance with a previously described aspect of the invention for secure on-board communication. The vehicle can be a passenger car or a truck.

DETAILED DESCRIPTION OF EMBODIMENTS

Figure 1:
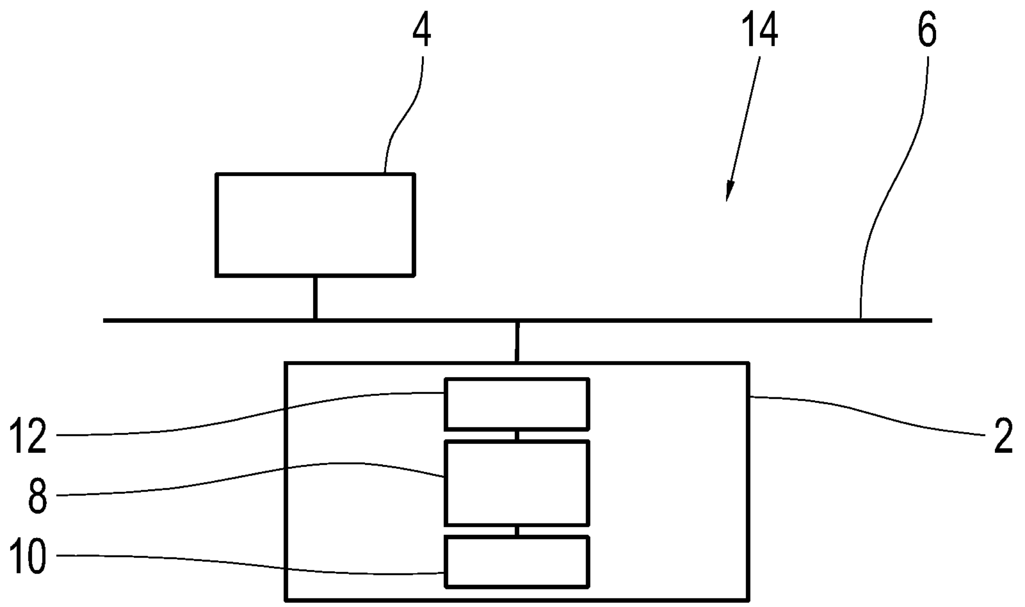
FIG. 1: A system according to an embodiment, which is designed to carry out a method for secure on-board communication.

FIG. 1 shows a system 14 according to an embodiment of the invention. The system 14 is used for secure on-board communication. The system 14 comprises a communication bus 6 and the components 2 and 4. The components 2 and 4 are control units. The communication bus 6 is a CAN bus. The components 2, 4 can be supplied with voltage by way of the communication bus 6 or via a separate voltage supply. The component 2 comprises a microcontroller 8, a storage medium 10 and a sender/receiver unit 12. The storage medium 10 is in this case in the form of a flash memory and is designed to store data in a non-volatile manner. In particular, it is possible to store data on the storage medium 10 of the component 2 for a period of time during which the voltage is not being continuously supplied to the component 2. On the storage medium are stored commands for carrying out a method for secure on-board communication, as described step by step below. The storage medium 10 is connected to the microcontroller 8. Alternatively, the microcontroller can include the storage medium 10, with the storage medium 10 also integrated in the microcontroller 8.

Furthermore, the sender/receiver unit 12 is designed to read data from the communication bus 6. Moreover, the sender/receiver unit 12 is designed to convert the data it has read from the communication bus 6 into data that can be processed by the microcontroller 8. In addition, the sender/receiver unit 12 is connected to the microprocessor 8. The sender/receiver unit 12 is also designed to send the converted data from the communication bus 6 to the microcontroller 8. Furthermore, the sender/receiver unit 12 is designed to convert data received from the microcontroller 8 into data that can be processed for the communication bus 6 and to send it thereto. The sender/receiver unit 12 is designed to implement protocols of Levels 1 and 2 of the OSI Level model.

Figure 2:
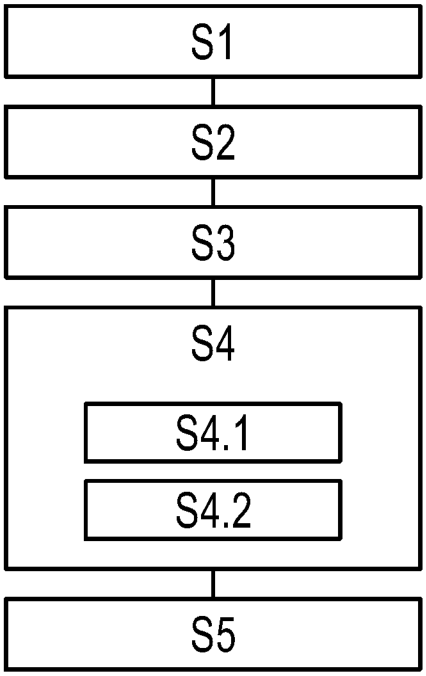
FIG. 2: Schematic representation of the steps of the method for secure on-board communication, in accordance with an embodiment.

The microcontroller 8 is designed to carry out the method steps shown schematically in FIG. 2 for secure on-board communication in accordance with an embodiment. In this case the microcontroller 8 works with the storage medium 10 and the sender/receiver unit 12. In a first step S1 the component 2 sends a message to the communication bus 6. During this the microcontroller 8 controls the sending S1 of the message by way of the sender/receiver unit 12 to the communication bus 6. In this case the microcontroller 8 is designed to implement Layers 3 and 4 of the OSI Layer model. According to an embodiment, the message sent to the communication bus 6 is previously read by the microcontroller 8 from the storage medium 10. Alternatively, or in addition, before it is sent to the communication bus 6 the message is sent via a further interface (not shown) of the component 2 to the microcontroller 8. The message sent by the microcontroller 8 contains a source address of the component 2. The source address of the component is stored in the storage medium 10, from which it can be read by the microcontroller 8, for example for the purpose of sending S1 or the purpose of comparison S4 as described later.

The component 2 is designed to carry out a step S2 of storing information about the message sent to the component. In particular, the microcontroller 8 is designed to carry out a step S2 of storing information about the message sent, on the storage medium 10. According to an embodiment, the microcontroller 8 stores a source address of the message that corresponds to the source address of the component 2, as well as information relating to the content of the message, such as a report, particularly in the form of a checksum, on the storage medium 10. In an embodiment, the microcontroller 8 stores the entire message on the storage medium 10.

The component 2 is designed to carry out the step S3 of reading all the messages on the communication bus 6. In particular, the microcontroller 8 is designed to actuate the sender/receiver unit 10 to read all the reports sent to the communication bus 6, convert them to data that can be processed by the microcontroller 8 and send them to the microcontroller 8.

Furthermore, the component 2 is designed to carry out the step S4 of comparing information in the read messages with the information in the sent message. In particular, the microcontroller 8 is designed to read the information of the sent message stored on the storage medium 10 and compare it with the messages and their information read from the communication bus 6 by way of the sender/received unit 12. In an embodiment, the microcontroller 8 reads information from all the messages sent by the component 2, which have been stored on the storage medium 10, for the comparison step S4.

The step S4 comprises a first part-step S4.1 of checking the read messages at the source address of the component 2. Here, the component 2 is designed in this first part-step to determine first the deviation of the information in the read messages from information in the messages sent by the component 2, for which read messages in each case an identifier contains the source address of the component 2. In particular, the microcontroller 8 is designed to check all the messages read from the communication bus 6 to see that they contain the source address in the identifier of the message read in each case.

In addition, the step S4 of comparing information in order to determine deviations comprises a second part-step S4.2 of checking for information deviations. In particular, the microcontroller 8 is designed, for all the messages read from the communication bus 6 that have an identifier which corresponds to the source address of the component 2, to check for information that deviates from all the messages sent and stored on the storage medium 10. In particular, a deviation of information between the read messages and the messages sent and stored on the storage medium 10 by the microcontroller is not carried out for those of the messages read from the communication bus 6 which do not correspond with the source address of the component 2. In an embodiment, an identifier that corresponds with the source address has that source address. A deviation exists when at least one message with the source address of the component 2 is read, which is not stored on the storage medium 10, or in other words which is different from all the messages stored on the storage medium 10.

The component 2 is further designed to carry out a step S5 of initiating a countermeasure. In particular, the microcontroller 8 is designed, if a deviation is shown to exist in the step S4 of comparing information from the read and the sent messages, to actuate the initiation of the countermeasure. According to an embodiment, the microcontroller 8 triggers an opening of the drive-train of a vehicle in which the system 14 for secure on-board communication is in use. By opening the drive-train a safer vehicle condition is produced.

The system 14 also comprises a further component 4. The said component is a control unit 4. According to an embodiment, the components 2 and 4 are designed to communicate with one another via the communication bus 6. In an embodiment the structure of the component 4 is analogous to that of the component 2, in particular the component 4 being designed to carry out the method described earlier with its steps S1 to S5. According to another embodiment, the component 4 has a sender/receiver unit of that type, which is designed to carry out a method for secure on-board communication centrally, for further control units of the system. In particular, it is not necessary to store all messages on a storage medium of the component 4 in order to carry out the method for secure on-board communication on the component 4.

Each component 2, 4 of the system 14 is designed, in the case of the secure on-board communication described here, to check the messages sent to it. In that way a modular structure for secure on-board communication via the communication bus 6 is obtained. In particular, in that way the secure on-board communication is distributed de-centrally between the components 2, 4. Accordingly, it is possible to extend the communication bus 6 with further components while maintaining the secure on-board communication, in an easy and particularly inexpensive manner. By the use of the above-described method with its steps S1 to S5, it is further possible to provide each further component with a conventional sender/receiver unit for secure on-board communication by way of the communication bus 6, since the commands for carrying out the above-described method for secure on-board communication are stored on a respective storage medium of the component and the microcontroller of that component is designed to carry out the said commands. In particular the hardware equipment of the further components, especially as regards a sender/receiver unit particularly designed for secure on-board communication, need not be enabled or modified.

INDEXES

2, 4 Component/control unit
6 Communication bus
8 Microcontroller
10 Storage medium
12 Sender/receiver unit
14 System
S1 (Step): Sending a message
S2 (Step): Storing an information of the message sent
S3 Step): Reading all the messages on the communication bus
S4 (Step): Comparison of information in the read and the sent messages
S4.1 (Step): Checking the read messages for the source address of the component
S4.2 (Step): Checking for information deviations
S5 (Step): Initiating a countermeasure

The invention claimed is:

1. A method for secure on-board communication between two or more components of a vehicle by way of a communication bus of the vehicle, said method comprising the steps:

sending a message group of messages from at least one of the two or more components to the communication bus, resulting in a group of sent messages;

storing, by at least one of the two or more components, information of the group of sent messages;

reading, by at least one of the two or more components, all messages on the communication bus, resulting in read messages;

comparing information in the read messages with the information in the group of sent messages;

determining a deviation between information in at least one of the read messages and the information in the group of sent messages;

determining, for the at least one read messages exhibiting the deviation, a match with a message previously stored in a storage medium; and suppressing initiation of a countermeasure for the determined deviation.

2. The method according to claim 1, wherein every message in the read messages has an identifier.

3. The method according to claim 2, wherein each identifier comprises a source address of at least one of the two or more components.

4. The method according to claim 3, wherein determining the deviation between the information in at least one of the read messages from the information in the sent message comprises:

checking, for each of the at least one read messages, whether the identifier contains the source address of at least one of the two or more components; and determining whether information in each of the at least one read messages deviates from the information in a corresponding message of the group of sent messages.

5. The method according to claim 4, wherein the deviation is determined if the information in at least one of the read messages differs from the information in all the messages sent by at least one of the two or more components.

6. The method according to claim 1, comprising:

initiating a countermeasure in response to determining the deviation.

7. The method according to claim 6, wherein initiating the countermeasure entails initiating a safer condition of the vehicle.

8. The method according to claim 7, wherein initiating the safer condition of the vehicle comprises one of opening a drive-train of the vehicle, by throttling down a motor power of a drive aggregate of the vehicle, or activating at least one actuator to actuate a component of the vehicle.

9. A control unit for a vehicle for secure on-board communication, comprising:

a communication bus;

a microcontroller configured to initiate a countermeasure in response to a deviation between read messages and sent messages between two or more components of the vehicle by way of the communication bus;

a storage medium; and a send/receive unit, wherein the microcontroller is configured to carry out a method using the storage medium and the sender/received send/receive unit, the method comprising:

sending a message from at least one of the two or more components to the communication bus, resulting in a sent message;

storing, by at least one of the two or more components, information of the sent message;

reading, by at least one of the two or more components, all messages on the communication bus, resulting in read messages;

comparing information in the read messages with the information in the sent message;

determining a deviation between information in the read messages and the information in the sent message;

determining, for the at least one read messages exhibiting the deviation from the sent messages, a match with a message previously stored in a storage medium; and suppressing initiation of the countermeasure for the determined deviation.

10. The system according to claim 9, further comprising a a further control unit.

11. The system according to claim 10, wherein the further control unit comprises:

a further microcontroller;

a further storage medium; and a further send/receive unit, wherein the further microcontroller is configured to carry out the method.

12. The system according to claim 10, wherein the further send/receive unit is configured to centrally carry out the method for secure on-board communication additional control units of the system.

13. A vehicle comprising the system according to claim 9.

* * * * *